(12) United States Patent
Jystad et al.

(10) Patent No.: US 7,801,943 B2
(45) Date of Patent: Sep. 21, 2010

(54) CATALOGING AUDIO CONTENT

(75) Inventors: Glenn E. Jystad, Dove Canyon, CA (US); Kim C. Smith, Dove Canyon, CA (US)

(73) Assignee: Gateway, Inc., Poway, CA (US)

( * ) Notice: Subject to any disclaimer, the term of this patent is extended or adjusted under 35 U.S.C. 154(b) by 560 days.

(21) Appl. No.: 10/142,074

(22) Filed: May 9, 2002

(65) Prior Publication Data

US 2003/0212786 A1    Nov. 13, 2003

(51) Int. Cl.
G06F 15/16    (2006.01)
G06F 15/167    (2006.01)

(52) U.S. Cl. .................................. 709/202; 709/212

(58) Field of Classification Search ......... 709/217–219, 709/201, 200, 202, 212, 224; 700/94; 369/30.05–30.09; 386/96
See application file for complete search history.

(56) References Cited

U.S. PATENT DOCUMENTS

| | | | | |
|---|---|---|---|---|
| 5,355,302 A * | 10/1994 | Martin et al. | ................ | 700/234 |
| 5,764,972 A * | 6/1998 | Crouse et al. | .................. | 707/1 |
| 5,953,005 A * | 9/1999 | Liu | .......................... | 715/500.1 |
| 5,959,945 A | 9/1999 | Kleiman | ..................... | 369/30 |
| 6,005,861 A | 12/1999 | Humpleman | ................ | 370/352 |
| 6,055,566 A | 4/2000 | Kikinis | ........................ | 709/219 |
| 6,065,042 A | 5/2000 | Reimer et al. | ................ | 709/203 |
| 6,144,376 A | 11/2000 | Connelly | ..................... | 345/327 |
| 6,237,049 B1 | 5/2001 | Ludtke | ........................... | 710/8 |
| 6,260,063 B1 | 7/2001 | Ludtke et al. | ............... | 709/224 |
| 6,502,194 B1 * | 12/2002 | Berman et al. | ................ | 726/28 |
| 6,609,105 B2 * | 8/2003 | Van Zoest et al. | ............. | 705/14 |
| 7,155,542 B2 * | 12/2006 | Trainin | ......................... | 710/29 |
| 7,209,900 B2 * | 4/2007 | Hunter et al. | ................. | 705/58 |
| 7,426,532 B2 * | 9/2008 | Bell et al. | .................... | 709/201 |
| 2001/0042249 A1 * | 11/2001 | Knepper et al. | ............... | 725/42 |
| 2002/0002483 A1 * | 1/2002 | Siegel et al. | .................. | 705/10 |
| 2002/0091799 A1 * | 7/2002 | Katz et al. | .................... | 709/219 |
| 2002/0116082 A1 * | 8/2002 | Gudorf | ........................ | 700/94 |
| 2002/0138165 A1 * | 9/2002 | Lord et al. | .................... | 700/94 |
| 2003/0028385 A1 * | 2/2003 | Christodoulou | ............. | 704/278 |
| 2003/0140114 A1 * | 7/2003 | Katz et al. | .................... | 709/217 |
| 2008/0147715 A1 * | 6/2008 | Woodward et al. | ........... | 707/102 |

OTHER PUBLICATIONS http:www.audioramp.com.
hm://www.5star-sharew.../Music/FileSharing/kazaa-media.html.

* cited by examiner

Primary Examiner—Asad M Nawaz
(74) Attorney, Agent, or Firm—Pearne & Gordon LLP

(57) ABSTRACT

A method, apparatus, and signal-bearing medium that monitors users' audio choices within a network and presents a sorted list of the most recent or most frequent choices in a user interface, from which the user may select. The sorted list may include attributes of the audio, such as the title, the genre, the artist, the source, and the number of times the audio has been played. The list may be kept on a per-user basis, so that all users have their own list. Further, the users may access their list anywhere in the network, and the list may be independent of the location in the network where the audio was played.

3 Claims, 4 Drawing Sheets

| | | USER NAME: SUSIE | | |
|---|---|---|---|---|
| ARTIST | TITLE | TIME PLAYED | GENRE | SOURCE |
| ARTIST 1 | | | | |
| | SONG 1 | 10 | ROCK | SOURCE 1 |
| | SONG 2 | 5 | ROCK | SOURCE 2 |
| ARTIST 2 | | | | |
| | SONG 3 | 8 | COUNTRY | SOURCE 1 |
| | SONG 4 | 6 | COUNTRY | SOURCE 1 |
| | SONG 5 | 1 | FOLK | SOURCE 1 |
| ARTIST 3 | | | | |
| | SONG 6 | 1 | CLASSICAL | SOURCE 3 |

CHANNEL 1   CHANNEL 2   CHANNEL 3

FIG. 3

CATALOGING AUDIO CONTENT

CROSS REFERENCE TO RELATED APPLICATIONS

This application is related to U.S. application Ser. No. 10/151,565 filed, May 20, 2002, entitled "Cataloging Digital Radio Stations" and to U.S. application Ser. No. 10/126,905 filed, Apr. 19, 2002, entitled "Remote Access to Aggregated Grouping of Distributed Content".

FIELD

This invention relates generally to a network of electronic devices and more particularly to cataloging audio content in a network of electronic devices.

BACKGROUND

Years ago, people listened to music on records and cassette tapes. But today, music has become increasingly more digital with people listening to music on compact discs (CDs) in players attached to computers, to radio stations over the Internet, and to digital music files stored on computers. As users build ever larger libraries of digital music, the number of audio files they must sort through can become cumbersome. For example, even just a few hundred CDs may store thousands of songs.

Thus, users must sort through large numbers of digital audio files to find the songs they wish to play. This problem is exacerbated by the nature of music consumption: users often listen to a set of favorite artists or CDs frequently in a short period of time. Thus, there is a need for a technique for assisting the user in finding and playing digital audio.

SUMMARY

A method, apparatus, and signal-bearing medium is provided that monitors and captures users' audio choices within a network and presents a sorted list of the most recent or most frequent choices in a user interface, from which the user may select. The sorted list may include attributes of the audio, such as the title, the genre, the artist, the source, and the number of times the audio has been played. The list may be kept on a per-user basis, so that all users may have their own list. Further, the users may access their list anywhere in the network, and the list may be independent of the location in the network where the audio was played.

BRIEF DESCRIPTION OF THE DRAWINGS

FIG. 3 depicts a pictorial representation of an example user interface, according to an embodiment of the invention.

DETAILED DESCRIPTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Figure 1:
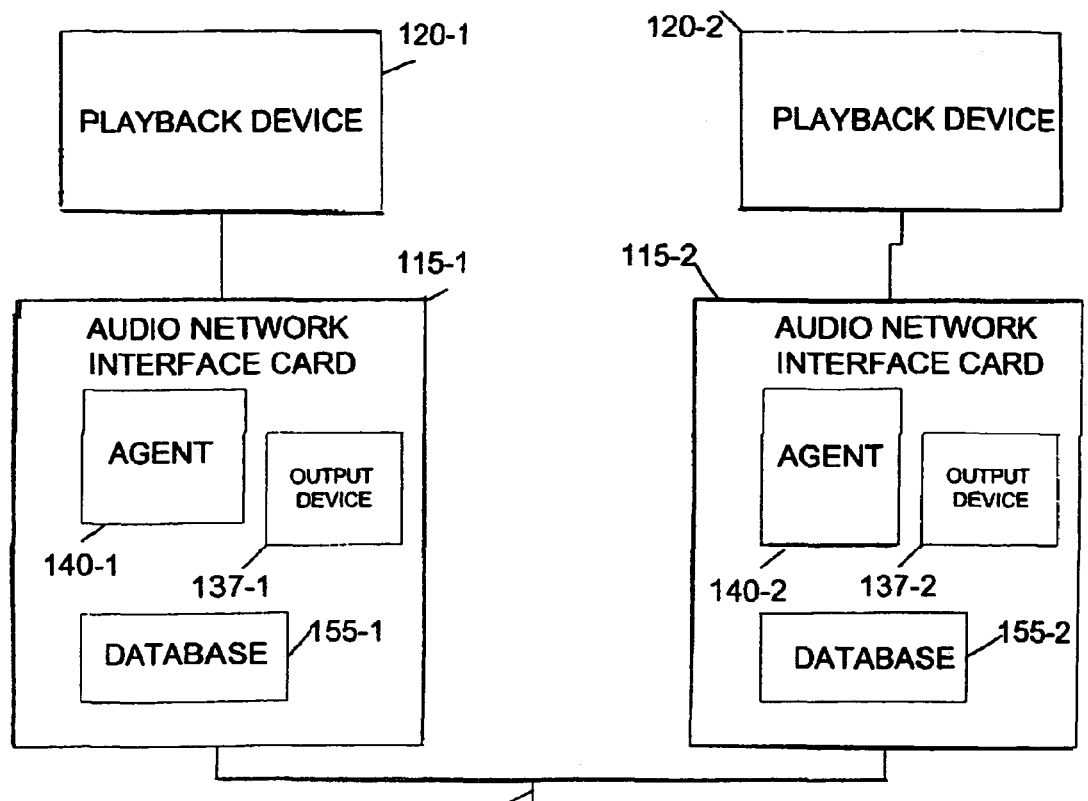
FIG. 1 depicts a block diagram of a system for implementing an embodiment of the invention.
Figure 1:
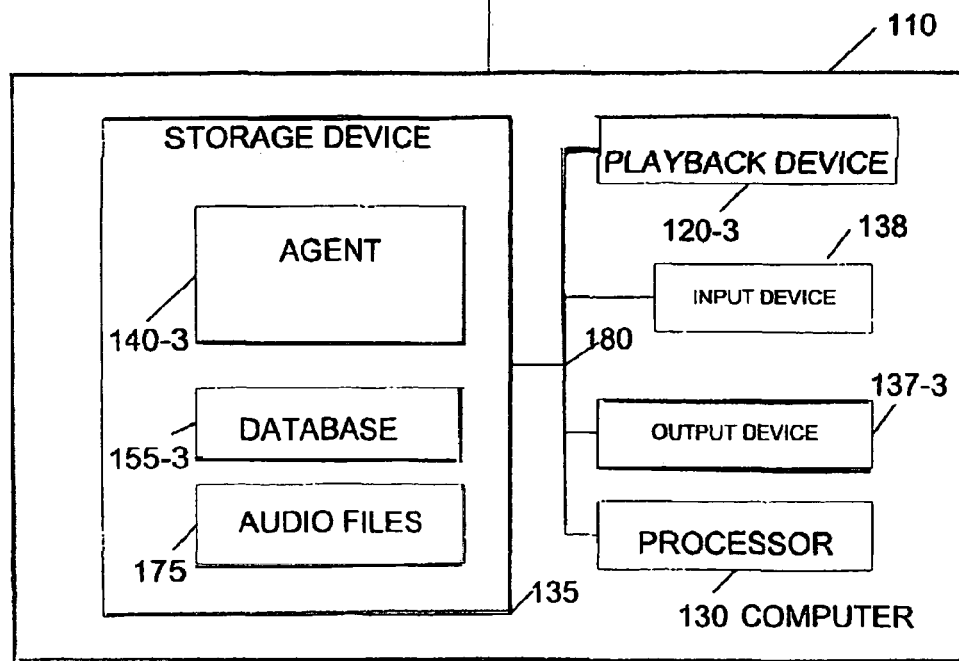

FIG. 1 depicts a block diagram of a system for implementing an embodiment of the invention.

A system 100 may include a computer 110 connected to audio network interface cards 115-1 and 115-2 and a network 190. The computer 110 and the audio network interface cards 115-1 and 115-2 may be connected via network 191. The audio network interface cards 115-1 and 115-2 may be connected to respective playback devices 120-1 and 120-2. Although one computer 110 is shown, in other embodiments any number of computers may be present. Although two audio network interface cards 115-1 and 115-2 are shown, in other embodiments any number of audio network interface cards may be present.

The computer 110 may include a playback device 120-3, a processor 130, a storage device 135, an output device 137-3, and an input device 138, all connected via a bus 180.

The playback device 120-3 may be a speaker, a stereo system, a boombox, or any other device capable of playing audio sounds. Although only one playback device 120-3 is shown in the computer 110, in another embodiment multiple playback devices may be present of the same type or different types. Although the playback device 120-3 is shown to be contained within the computer 110, in another embodiment the playback device 120-3 may be external to the computer 110.

The processor 130 may represent a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 130 may execute instructions and may include that portion of the computer 110 that controls the operation of the entire computer. Although not depicted in FIG. 1, the processor 130 typically includes a control unit that organizes data and program storage in memory and transfers data and other information between the various parts of the computer 110. The processor 130 may receive input data from the audio network interface cards 115-1 and 115-2 and the network 190, may read and store code and data in the storage device 135, may send data to the audio network interface cards 115-1 and 115-2, may send audio signals to the playback device 120-3, and may present data to the output device 137-3.

Although the computer 110 is shown to contain only a single processor 130 and a single bus 180, the present invention applies equally to computers that may have multiple processors and to computers that may have multiple buses with some or all performing different functions in different ways.

The storage device 135 represents one or more mechanisms for storing data. For example, the storage device 135 may include read only memory (ROM), random access memory (RAM), magnetic disk storage media, optical storage media, flash memory devices, and/or other machine-readable media. In other embodiments, any appropriate type of storage device may be used. Although only one storage device 135 is shown, multiple storage devices and multiple types of storage devices may be present. Further, although the computer 110 is drawn to contain the storage device 135, it may be distributed across other computers.

The storage device 135 may include an agent 140-3, a database 155-3, and audio files 175. The agent 140-3 may include instructions capable of being executed on the processor 130 to carry out the functions of the present invention, as further described below with reference to FIG. 4. In another embodiment, some or all of the functions of the present invention may be carried out via hardware in lieu of a processor-based system. Of course, the storage device 135 may also contain additional software and data (not shown), which is not necessary to understanding the invention.

The database 155-3 may contain attributes of audio that have been played on a peruser basis. Thus, subsets of the attributes are associated with particular users. The attributes may include, for example, the genre of the audio, the title of the audio, the number of times that the user has played the audio, the artist of the audio, and an identification of the source of the audio. In other embodiments, the database 155-3 may include any appropriate attributes of the audio. The database 155-3 is further described below with respect to FIGS. 2, 3, and 4. Agent 140-3 may query the audio network interface cards 115-1 and 115-2 for the audio played at their respective playback devices 120-1 and 120-2 and may incorporate their respective attributes into the database 155-3. In this way, the database 155-3 may include information about the audio content that the user has played regardless of whether the audio was played at playback device 120-1, 120-2, or 120-3.

The audio files 175 may include a digital representation of audio content. In an embodiment the audio files 175 may include a digital representation of music, such as songs. But, in another embodiment, the audio files may contain a digital representation of any sounds. Although the audio files 175 are drawn to be in computer 110, in another If embodiment the audio files 175 may be accessed across the network 190.

The output device 137-3 is that part of the computer 110 that displays output to the user. The output device 137-3 may be a cathode-ray tube (CRT) based video display well known in the art of computer hardware. But, in other embodiments the output device 137-3 may be replaced with a liquid crystal display (LCD) based or gas, plasma-based, flat-panel display. In still other embodiments, any appropriate display device may be used. Although only one output device 137-3 is shown, in other embodiments, any number of output devices of different types or of the same type may be present. In another embodiment, the output device 137-3 may not be present.

The input device 138 may be a keyboard, mouse, trackball, touchpad, touchscreen, keypad, voice recognition device or any other appropriate mechanism for the user to input data to the computer 110. Although only one input device 138 is shown, in another embodiment any number of input devices may be present.

The bus 180 may represent one or more busses, e.g., PCI, ISA (Industry Standard Architecture), X-Bus, EISA (Extended Industry Standard Architecture), or any other appropriate bus and/or bridge (also called a bus controller).

The computer 110 may be implemented using any suitable hardware and/or software, such as a personal computer or other electronic computing device. Portable computers, laptop or notebook computers, PDAs (Personal Digital Assistants), two-way alphanumeric pagers, keypads, portable telephones, pocket computers, and mainframe computers are examples of other possible configurations of the computer 110. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted. Thus, an embodiment of the invention may apply to any hardware configuration that supports playing audio in a network.

The audio network interface card 115-1 may be an electronic device capable of receiving a digital stream of audio content and decoding that stream into an analog output compatible with a standard stereo system input. The audio network interface card 115-1 may include an output device 137-1, an agent 140-1, and a database 155-1. In another embodiment, the audio network interface card 115-1 may also include an input device (not shown) analogous to the input device 138.

The output device 137-1 may be analogous to the output device 137-3, as previously described above. In another embodiment, the output device 137-1 may not be present.

The agent 140-1 may be analogous to the agent 140-3, as previously described above. The database 155-1 may include audio that has been played, as further described below with respect to FIGS. 2, 3, and 4. Agent 140-1 may query the audio network interface card 115-2 and the computer 110 for attributes of the audio played at their respective playback devices 120-2 and 120-3 and may incorporate their respective attributes into the database 155-1.

The audio network interface card 115-2 may be analogous to the audio network interface card 115-1, as previously described above, and may include an output device 137-2, an agent 140-2, and a database 155-2. In another embodiment, the audio network interface card 115-2 may also include an input device (not shown) analogous to the input device 138.

The agent 140-2 may be analogous to the agent 140-3. The database 155-2 may include audio that has been played, as further described below with respect to FIGS. 2, 3, and 4. Agent 140-2 may query the audio network interface card 115-1 and the computer 110 for attributes of the audio played at their respective playback devices 120-1 and 120-3 and may incorporate their respective attributes into the database 155-2.

The output device 137-2 may be analogous to the output device 137-3, as previously described above. In another embodiment, the output device 137-2 may not be present.

The playback devices 120-1 and 120-2 may be analogous to the playback device 120-3.

Although audio network interface cards 115-1 and 115-2 are shown to be separate from their respective playback devices 120-1 and 120-2, in another embodiment they may be integrated together.

The network 190 may be any suitable network and may support any appropriate protocol suitable for communication to the computer 110. In an embodiment, the network 190 may support wireless communications. In another embodiment, the network 190 may support hard-wired communications, such as a telephone line or cable. In another embodiment, the network 190 may support the Ethernet IEEE 802.3x specification. In another embodiment, the network 190 may be the Internet and may support IP (Internet Protocol). In another embodiment, the network 190 may be a local area network (LAN) or a wide area network (WAN). In another embodiment, the network 190 may be a hotspot service provider network. In another embodiment, the network 190 may be an intranet. In another embodiment, the network 190 may be a GPRS (General Packet Radio Service) network. In another embodiment, the network 190 may be any appropriate cellular data network or cell-based radio network technology. In another embodiment, the network 190 may be an IEEE (Institute of Electrical and Electronics Engineers) 802.11B wireless network. In still another embodiment, the network 190 may be any suitable network or combination of networks. Although one network 190 is shown, in other embodiments any number of networks (of the same or different types) may be present. The network 191 may be analogous to the network 190.

As will be described in detail below, aspects of an embodiment pertain to specific apparatus and method elements implementable on an electronic device. In another embodiment, the invention may be implemented as a program product for use with an electronic device. The programs defining the functions of this embodiment may be delivered to an electronic device via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, including wireless communications.

Such signal-bearing media, when carrying machine-readable instructions that direct the functions of the present invention, represent embodiments of the present invention.

Figure 2:
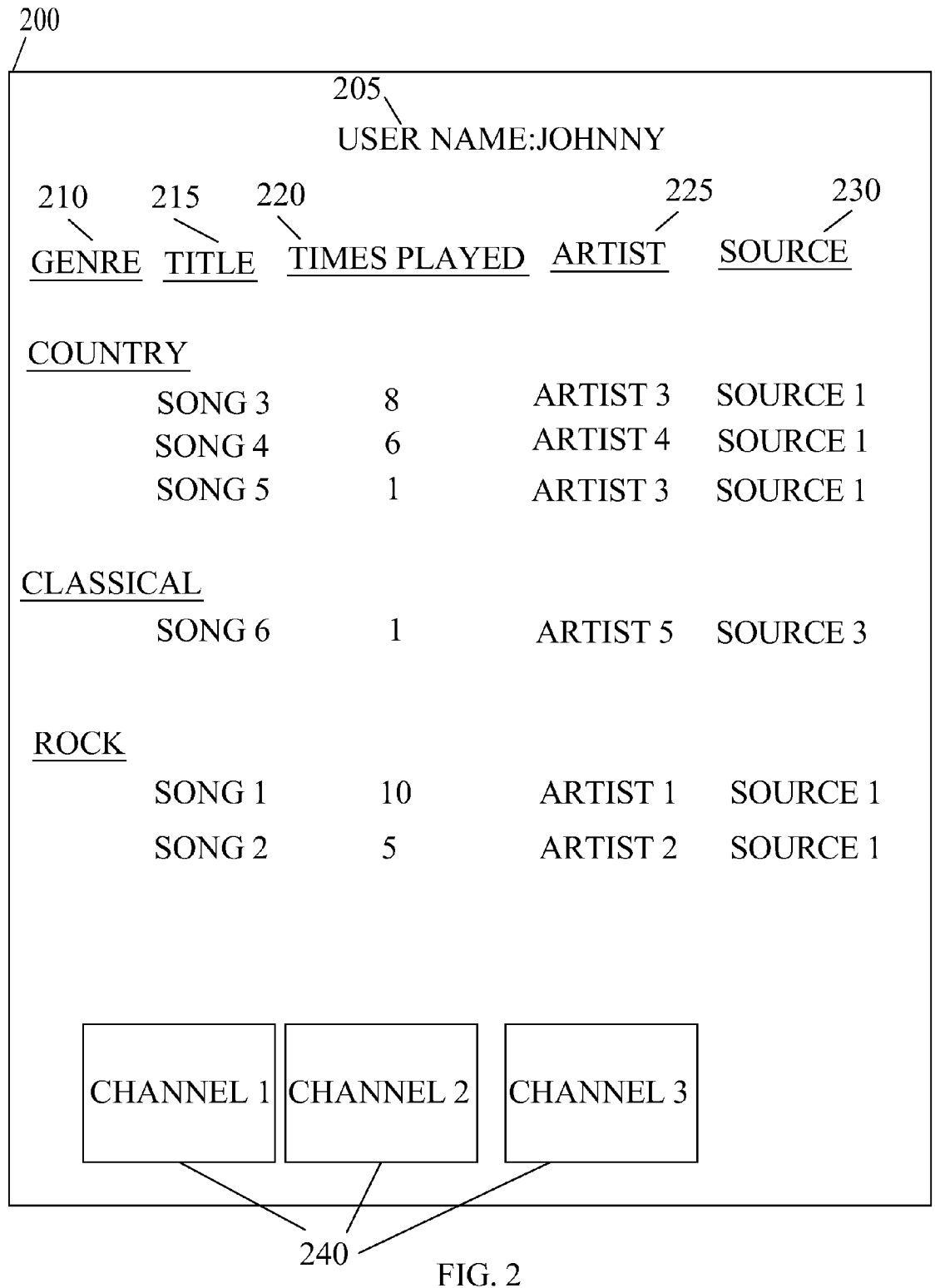
FIG. 2 depicts a pictorial representation of an example user interface, according to an embodiment of the invention.

FIG. 2 depicts a pictorial representation of an example user interface 200, which may be displayed on any of the output devices 137-1, 137-2, and 137-3, according to an embodiment of the invention. The user interface 200 may include a sorted list of the audio content that a particular user has played and may include a user name 205, attribute data associated with the played audio content for the user.

The user name 205 identifies the user associated with the attribute data displayed in the user interface 200. In this example, the user name 205 is "Johnny." Examples of attribute data are a genre 210, a title 215, a times played 220, an artist 225, and a source 230. The genre 210 indicates the categories associated with the various audio that the user has played in the past. In the example shown, genres that this user has played include "rock," "country," and "classical," but any appropriate genres may be present. The title 215 indicates the titles of the audio that this user has played. In the example shown, the titles are "song 1," "song 2," "song 3," "song 4," "song 5," and "song 6." But, any appropriate titles may be used. The times played 220 indicates the number of times that this user has played the audio. The artist 225 indicates the artist who created the audio. The source 230 indicates the source of the audio. For example, the source 230 may indicate the address of the audio within the audio files 175. Attribute data is displayed on a per-user basis regardless of the playback device 120-1, 120-2, and 120-3 that played the associated audio and regardless of where in the network that the user requested the user interface 200.

Thus, in this example, Johnny has played song 1 ten times, song 1 is sung by artist 1, and song 1 is found in source 1. In this example, the displayed data within the user interface 200 is sorted by the times played 220 within genre 210, but in other embodiments, the displayed data may be sorted using any keys and sort order.

FIG. 3 depicts a pictorial representation of an example user interface 300, which may be displayed on any of output devices 137-1, 137-2, and 137-3, according to an embodiment of the invention. The user interface 300 may include a sorted list of the audio content that a particular user has played and may include a user name 305, attribute data associated with the played audio content for the user. The user name 305 identifies the user associated with the attribute data displayed in the user interface 300. In this example, the user name 305 is "Susie."

Examples of attribute data are an artist 310, a title 315, a times played 320, a genre 325, and a source 330. The genre 325 indicates the categories associated with the various audio that the user has played in the past. In the example shown, genres that this user has played include "rock," "country," "folk," and "classical," but any appropriate genres may be present. The title 315 indicates the titles of the audio that this user has played. In the example shown, the titles are "song 1," "song 2," "song 3," "song 4," "song 5," and "song 6." But, any appropriate titles may be used. The times played 320 indicates the number of times that this user has played the audio. The artist 310 indicates the artist who created the audio. The source 330 indicates the source of the audio. For example, the source 330 may indicate the address of the audio within the audio files 175.

Thus, in this example, Susie has played song 1 ten times, song 1 is sung by artist 1, and song 1 is found in source 1. In this example, the displayed data within the user interface 300 is sorted by the times played 320 within the artist 310, but in other embodiments, the displayed data may be sorted using any keys and sort order.

Figure 4:
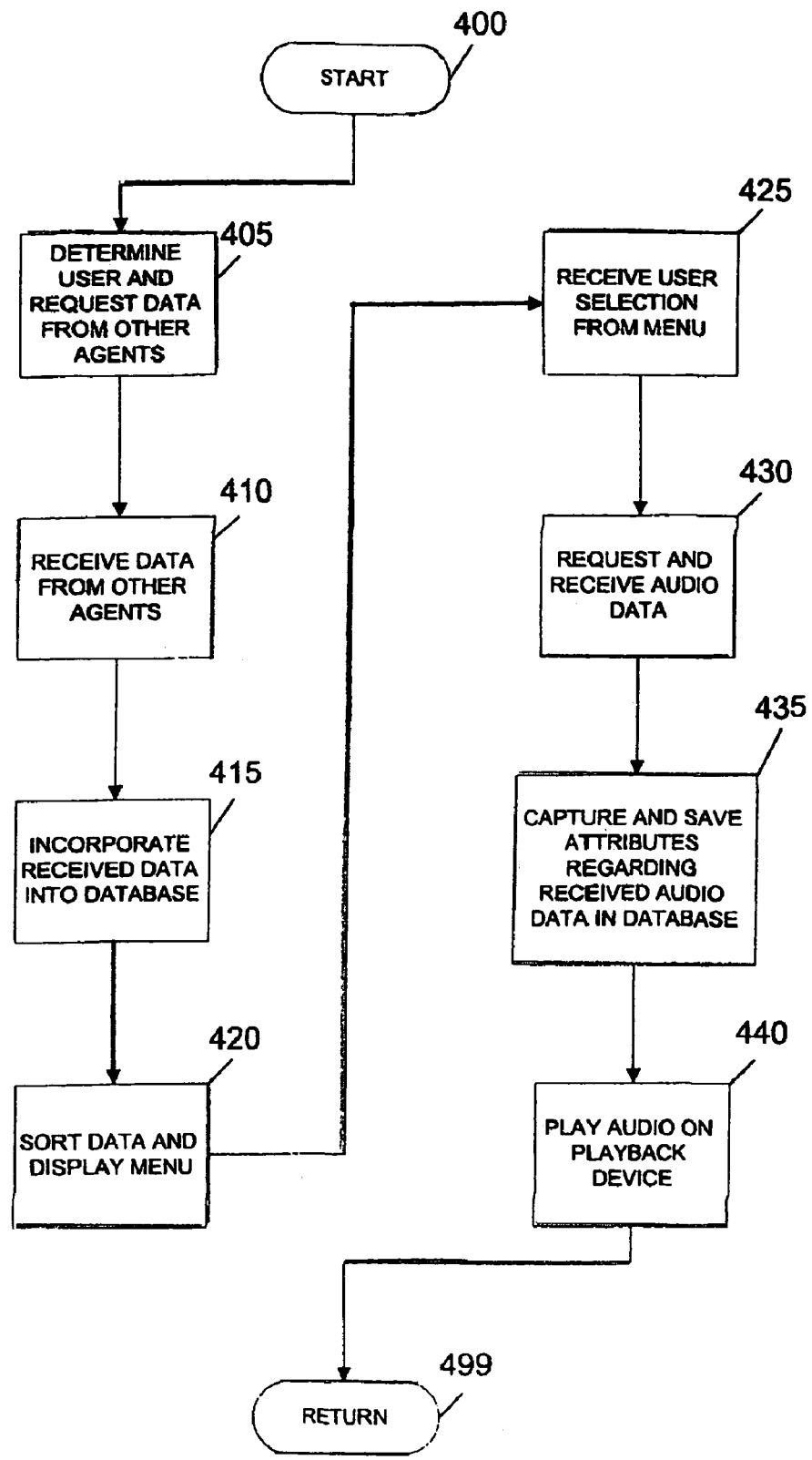
FIG. 4 depicts a flowchart of example processing, according to an embodiment of the invention.

FIG. 4 depicts a flowchart of example processing, according to an embodiment of the invention. Although the processing for FIG. 4 will be described in terms of the agent 140-3 operating at the computer 110, in other embodiments, the processing may be performed by the agent 140-1 operating at the audio network interface card 115-1 or the agent 140-2 operating at the audio network interface card 115-2.

Control begins at block 400. Control then continues to block 405 where the agent 140-3 receives a request a user, e.g., from the input device 138, determines the user who initiated the request and requests data associated with the user from the databases 155-1 and 155-2.

Control then continues to block 410 where the agent 140-3 receives the requested data from the databases 155-1 and 155-2 via agents 140-1 and 140-2, respectively.

Control then continues to block 415 where the agent 140-3 incorporates the received data into the database 155-3. The database 155-3 now contains up-to-date data regarding audio that the current user has played. By incorporating data from the other databases 155-1 and 155-2, the database 155-3 now contains attributes for the audio that the current user has played regardless of which playback device 120-1, 120-2, or 120-3 played the audio. Thus, for example, even though the user is accessing the user interface from a computer in the den, the audio that was previously played by that user on a boombox in the garage and a stereo system in the family room will still be in the user interface.

Control then continues to block 420 where the agent 140-3 displays a user interface on the output device 137-3 that contains data from the database 155-3, including identifications of the audio that the current user has played and attributes of the audio content. Thus, the agent 140-3 determines a subset of the data in the database 155-3 that is associated with the current user. In an embodiment, the agent 140-3 may sort the data in the user interface by any attribute field, such as genre, title, times played, artist, or source. In another embodiment, the agent 140-3 may sort the data in the user interface by the time that the audio was played, e.g. with the most recently-played audio first. In another embodiment, the agent 140-3 may sort the data in the user interface by the frequency that the audio was played, e.g., with the most frequently-played audio first. In other embodiments, the agent 140-3 may sort the data using multiple attributes. Examples of the displayed user interface are shown in FIGS. 2 and 3, as previously described above.

Referring again to FIG. 4, control then continues to block 425 where the agent 140-3 receives a user selection from the user interface that was previously displayed at block 420. Control then continues to block 430 where the agent 140-3 requests and receives audio from the audio files 175.-

Control then continues to block 435 where the agent 140-3 captures and saves attributes regarding the received audio into the database 155-3. The attributes may include the genre of the audio, the title of the audio, the number of times that the current user has played the audio, the artist of the audio, and an identification of the source of the audio. In other embodiments, the agent 140-3 may capture and save any appropriate attributes of the audio into the database 155-3.

Control then continues to block 440 where the agent sends the audio to the playback device 120-3 for playback. Control then continues to block 499 where the function returns.

In this way, users' audio choices within a network are monitored and a sorted list of the most recent or most frequent choices is presented in a user interface, from which the user may select. The sorted list may include attributes of the audio, such as the title, the genre, the artist, the source, and the number of times the audio has been played. The list may be kept on a per-user basis, so that all users may have their own list. Further, the users may access their list anywhere in the network, and the list may be independent of the location in the network where the audio was played.

What is claimed is:

1. An audio network interface card for connecting to a playback device, comprising;
    a storage device having a database stored thereon; and
    an agent to detect attributes of audio played at the playback device, store the attributes in the database, and send the attributes to another agent when requested, the agent further storing in the database an identification of a user who requested play of the audio on the playback device;
    wherein said another agent comprises an agent of a further audio network interface card connected to a further playback device;
    wherein the attributes are combined with further attributes detected by said another agent to make combined attributes;
    wherein the combined attributes are segregated by the agent into grouping according to the identification of the user, and the attributes include number of times the audio was played.

2. The audio network interface card of claim 1 wherein the attributes further include a genre of the audio device.

3. The audio network interface card of claim 1 wherein the attributes further include an artist of the audio.

* * * * *